United States Patent
Yoo et al.

(10) Patent No.: US 7,206,033 B2
(45) Date of Patent: Apr. 17, 2007

(54) LIQUID CRYSTAL DISPLAY AND FABRICATING METHOD

(75) Inventors: Hong Suk Yoo, Kunpo-shi (KR); Woo Hyun Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/028,300

(22) Filed: Dec. 28, 2001

(65) Prior Publication Data
US 2002/0140876 A1  Oct. 3, 2002

(30) Foreign Application Priority Data
Dec. 29, 2000  (KR)  ............................. 2000-85273

(51) Int. Cl.
*G02F 1/1343* (2006.01)
(52) U.S. Cl. .......................... 349/38; 349/43; 349/138
(58) Field of Classification Search .................. 349/43, 349/38, 42, 39, 138, 139, 187
See application file for complete search history.

(56) References Cited

U.S. PATENT DOCUMENTS

| | | | |
|---|---|---|---|
| 5,672,888 A * | 9/1997 | Nakamura | 257/72 |
| 5,920,362 A * | 7/1999 | Lee | 349/38 |
| 5,998,838 A * | 12/1999 | Tanabe et al. | 257/347 |
| 6,137,551 A * | 10/2000 | Jeong | 349/38 |
| 6,317,173 B1 * | 11/2001 | Jung et al. | 349/42 |
| 6,356,318 B1 * | 3/2002 | Kawahata | 349/38 |

FOREIGN PATENT DOCUMENTS

KR  1997-27642  6/1997

* cited by examiner

*Primary Examiner*—Dung T. Nguyen
*Assistant Examiner*—Thoi V. Duong
(74) *Attorney, Agent, or Firm*—McKenna Long & Aldridge LLP

(57) ABSTRACT

A liquid crystal display and a fabricating method thereof that are capable of realizing a high aperture ratio as well as implementing a high-density storage capacitor. The liquid crystal display is provided with a data line supplied with a data signal, a gate line supplied with a scanning signal, a pixel electrode for driving a liquid crystal cell, and a thin film transistor for applying the data signal to the pixel electrode in response to the scanning signal. In the liquid crystal display, a gate insulating film covers the gate line. A storage electrode is formed at the interior of the gate insulating film to overlap with the gate line. Accordingly, the storage electrode is formed within the gate insulating film to reduce a thickness between the conductive materials, thereby increasing a capacitance value. As a result, the storage capacitor area is set to a small size to thereby improve an aperture ratio.

25 Claims, 9 Drawing Sheets

LIQUID CRYSTAL DISPLAY AND FABRICATING METHOD

This application claims the benefit of Korean Patent Application No. 2000-85273, filed on Dec. 29, 2000, the entirety of which is hereby incorporated by reference for all purposes as if fully set forth herein.

BACKGROUND OF THE INVENTION

1. Field of the Invention

This invention relates to a liquid crystal display, and more particularly to a liquid crystal display and a fabricating method thereof that are capable of realizing a high aperture ratio as well as implementing a high-density storage capacitor.

2. Description of the Related Art

Generally, a liquid crystal display (LCD) controls the light transmissivity of a liquid crystal cell in response to a video signal to display a picture. An active matrix LCD having a switching device for each liquid crystal cell is suitable for displaying a moving picture. The active matrix LCD mainly uses a thin film transistor (TFT) as the switching device. Since such an active matrix LCD can be made into a smaller device in size than the existent Brown tube or Cathrode Ray Tube (CRT), it has been widely used for a personal computer or a notebook computer as well as office automation equipment such as a copy machine, and portable equipment such as a cellular phone and a pager.

Referring to FIG. 1 and FIG. 2, the conventional LCD includes a gate line 2 and a data line 4 formed on a substrate 1 to cross each other, a TFT arranged at an intersection between a data line 4 and a gate line 2, and a storage capacitor overlapping with the gate line 2.

The gate line 2 and the data line 4 are electrically isolated from each other by a gate insulating film 9. Each pixel is driven by the TFT and electrically connected to the gate line 2 and the data line 4.

The TFT includes a gate electrode 54, a source electrode 51, a drain electrode 52, an active layer 5 and an ohmic contact layer 10. The gate electrode 54 is connected to the gate line 2. The gate insulating film 9 is entirely deposited onto the substrate 1 to cover the gate electrode 54 and the gate line 2. The active layer 5 and the ohmic contact layer 10 are formed on the gate insulating film 9 to overlap with the gate electrode 54. The source electrode 51 is connected to the data line 4 while the drain electrode 52 is opposed to the source electrode 51 having a desired channel size therebetween.

A protective layer 53 is entirely deposited onto the gate insulating film 9 to cover the gate line 2, the data line 4 and the TFT. A pixel electrode 55a is connected to the drain electrode 52 via a first contact hole 8, and is provided on the protective layer 53.

The storage capacitor is charged by a voltage on the previous gate line 2 upon scanning of the previous scanning line to apply the charged voltage to the pixel electrode 55a upon scanning of the following scanning line. The storage capacitor includes the gate line 2 and a storage electrode 6 opposed to each other having the gate insulating film 9 therebetween. The storage electrode 6 is connected to a transparent electrode pattern 55b via a second contact hole 18 defined on the protective layer 53. The transparent electrode pattern 55b is patterned simultaneously with the pixel electrode 55a.

FIG. 3A to FIG. 3E are sectional views for explaining a method of fabricating the LCD device shown in FIG. 2.

Referring first to FIG. 3A, the gate electrode 54 and the gate line 2 are provided on the substrate 1. The gate electrode 54 and the gate line 2 are formed by entirely depositing a metal such as aluminum (Al) or copper (Cu), etc. onto the substrate 1 and then patterning it.

Referring to FIG. 3B, the active layer 5 and the ohmic contact layer 10 are provided on the gate insulating film 9.

The gate insulating film 9 is formed by depositing an insulating material such as silicon nitride ($SiN_x$) or silicon oxide ($SiO_x$) and then patterning it. The active layer 5 is formed from amorphous silicon that is not doped with an impurity. In contrast, the ohmic contact layer 10 is formed from amorphous silicon doped with an n-type or p-type impurity at a high concentration.

The active layer 5 and the ohmic contact layer 10 are formed by depositing first and second semiconductor material layers after forming the gate insulating film 9 on the substrate 1 to cover the gate electrode 54 and then patterning them.

Referring to FIG. 3C, the data line 4 (not shown), the storage electrode 6, the source electrode 51 and drain electrode 52 are provided on the gate insulating film 9. The source electrode 51 and drain electrode 52 are formed by entirely depositing a metal layer such as chromium (Cr) or molybdenum (Mo) using a chemical vapor deposition (CVD) technique or a sputtering technique and then patterning it. After the source electrode 51 and drain electrode 52 were patterned, the ohmic contact layer 10 is formed at an area corresponding to the gate electrode 54 and is also patterned to expose the active layer 5. A portion of the active layer 5 exposed by the source electrode 51 and drain electrode 52 serves as a channel. The data line 4 (not shown), the storage electrode 6, the source electrode 51 and drain electrode 52 are made from a metal such as chromium (Cr) or molybdenum (Mo).

Referring to FIG. 3D, the protective layer 53 and the first contact hole 8 and second contact hole 18 are provided on the gate insulating film 9.

The protective layer 53 and the first contact hole 8 and second contact hole 18 are formed by depositing an insulating material on the gate insulating film 9 to cover the source electrode 51 and drain electrode 52 and then patterning it. The protective layer 53 is made from an inorganic insulating material such as silicon nitride ($SiN_x$) or silicon oxide ($SiO_x$), or an organic insulating material having a small dielectric constant such as an acrylic organic compound, Teflon, benzocyclobutene (BCB), Cytop or perfluorocyclobutane (PFCB).

The protective layer 53 is provided with the first contact hole 8 and second contact hole 18. The first contact hole 8 is defined to pass through the protective layer 53, to thereby expose a portion of the surface of the drain electrode 52. Similarly, the second contact hole 18 is defined to pass through the protective layer 53, to thereby expose a portion of the surface of the storage electrode 6.

Referring to FIG. 3E, the pixel electrode 55a is provided on the protective layer 53. The pixel electrode 55a is formed by depositing a transparent conductive material such as indium-tin-oxide (ITO), indium-zinc-oxide (IZO) or indium-tin-zinc-oxide (ITZO) on the protective layer 53 and then patterning it. The pixel electrode 55a is electrically connected, via the first contact hole 8, to the drain electrode 52, and is electrically connected, via the second contact hole 18, to the storage electrode 6.

In such an LCD, the storage electrode 6 should have a sufficiently large capacitance value so that it can reduce variation in a data voltage charged in the pixel electrode 55a.

Although the storage electrode 6 is extended into a pixel area to increase its capacitance value, the pixel area is narrowed by the extension of the storage electrode 6 into the pixel area, thus reducing aperture ratio. Moreover, since black matrices provided on the upper glass substrate to protect light leakage between the pixels overlap with the pixel area by approximately 5 μm at the left/right end and the upper/lower end of the pixel electrode 55a, the pixel area is reduced by the overlap and, hence, aperture ratio is reduced.

FIG. 4 represents an equivalent circuit of a pixel cell in the LCD.

In FIG. 4, a value of a storage capacitor Cst for keeping a voltage drop Vdrop within 80 mV (i.e., 1 gray voltage of 64 gray levels) can be given by the following equations:

$$V_{lc}(t)=V_{lc}(0)[\text{Exp}(-T_f/R_{off}C_t)](\text{If } V_{drop}=V_{lc}(0)-V_p(t)) \quad (1)$$

wherein Vlc represents a liquid crystal driving voltage; Tf is one frame interval; Roff is an internal resistance; Vp is a pixel voltage; Vdrop is a voltage drop; and Ct is total capacitor value (i.e., liquid crystal capacitance, Clc+storage capacitor value Cst).

$$V_{drop}=V_{lc(0)}[1-\text{Exp}(-T_f/R_{off}C_t)] \quad (2)$$

wherein Vdrop represents a voltage drop; Tf is one frame interval; Vlc is a liquid crystal driving voltage; and Ct is total capacitor value.

$$C_t>(T_f/R_{off})/L_n[V_i/(V_i-V_{drop})] \quad (3)$$

wherein Ln represents an inductance; and Vi is an initial voltage.

In equation (3), Ct=Clc+Cst; Tf=16.7 ms (1 frame interval); Vlc=5 V; Vdrop=80 mV; and Roff=Vi/Ioff=5 V/4 pA=1.25E+12 Ω.

Table 1 describes an area and an occupied ratio of the storage capacitor according to a resolution when a thickness of the gate insulating film 9 formed between the storage electrode 6 and the gate line 3 in a high-resolution LCD shown in FIG. 1 is 4000 Å.

TABLE 1

|  | Sub-Pixel size | Clc | Requested minimal Cst | Storage size | Occupied ratio |
|---|---|---|---|---|---|
| 300 PPI | 2.39E-09 | 3.4E-14 | 8.14E-13 | 5.49E-09 | 230.0% |
| 250 PPI | 3.46E-09 | 5.5E-14 | 7.93E-13 | 5.35E-09 | 154.8% |
| 200 PPI | 5.29E-09 | 9.3E-14 | 7.56E-13 | 5.10E-09 | 96.3% |
| 150 PPI | 9.53E-09 | 1.8E-13 | 6.64E-13 | 4.48E-09 | 47.0% |
| 100 PPI | 2.15E-09 | 4.5E-13 | 3.95E-13 | 2.67E-09 | 12.4% |

It can be seen from Table 1 that, as a resolution increases, a ratio of an area occupied by the storage capacitor within a unit pixel increases. Also, the aperture ratio of the LCD is greatly reduced.

Table 2 compares a storage capacitor value and an aperture ratio of a high-resolution LCD with those of a ferroelectric liquid crystal display (FLCD) when a thickness of the gate insulating film 9 formed between the storage electrode 6 and the gate line 3 is 4000 Å.

TABLE 2

|  | 200 PPI | FLCD MODEL 1 | FLCD MODEL 2 |
|---|---|---|---|
| Sub-Pixel | 5292 | 25947 | 25947 |
| Storage | 599 | 2784.5 | 7113.7 |
| Aperture area | 2414 | 15373.5 | 11044.3 |
| Aperture ratio | 45.60% | 59.2% | 42.6% |

As can be seen from Table 2, although a storage capacitor value of a ferroelectric liquid crystal display (FLCD) is three times larger than that of a conventional liquid crystal display panel, an aperture ratio of a FLCD is approximately 50% in comparison with that of a conventional liquid crystal display panel.

SUMMARY OF THE INVENTION

Accordingly, the present invention is directed to a liquid crystal display and fabricating method that substantially obviates one or more of the problems due to limitations and disadvantages of the related art.

An advantage of the present invention is to provide a liquid crystal display and a fabricating method thereof that are capable of realizing a high aperture ratio as well as implementing a high-density storage capacitor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages of the invention, a liquid crystal display according to one aspect of the present invention includes a data line supplied with a data signal; a gate line supplied with a scanning signal; a pixel electrode for driving a liquid crystal cell; a thin film transistor for applying the data signal to the pixel electrode in response to the scanning signal including a gate insulating film covering the gate line; and a storage electrode formed at the interior of the gate insulating film wherein the storage electrode overlaps with the gate line.

In the liquid crystal display, a distance between the gate line and the storage electrode is about 500 to 2500 Å.

The liquid crystal display further includes a protective layer formed on the gate insulating film wherein the protective layer covers the data line, the gate line and the thin film transistor.

In the liquid crystal display, the pixel electrode is connected to the storage electrode via a contact hole passing through the gate insulating film and the protective layer.

A method of fabricating a liquid crystal display according to another aspect of the present invention includes forming a gate line and a gate electrode of a thin film transistor on a substrate; depositing a first gate insulating film on the substrate to cover the gate electrode and the gate line; forming a storage electrode on the first gate insulating film to overlap with the gate line; depositing a second gate insulating film on the first gate insulating film to cover the storage electrode; forming an active layer and an ohmic contact layer on the gate insulating film; forming a source electrode and a drain electrode of the thin film transistor opposed to each other and having a desired channel therebetween on the ohmic contact layer; forming a protective layer on the gate insulating film to cover the source electrode and the drain electrode; defining a first contact hole for exposing the drain electrode on the protective layer; defining a second contact hole for exposing the storage electrode on the protective layer and the second gate insulating film; and forming a pixel electrode connected to the drain electrode via the first contact hole and connected to the storage electrode on the protective layer via the second contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
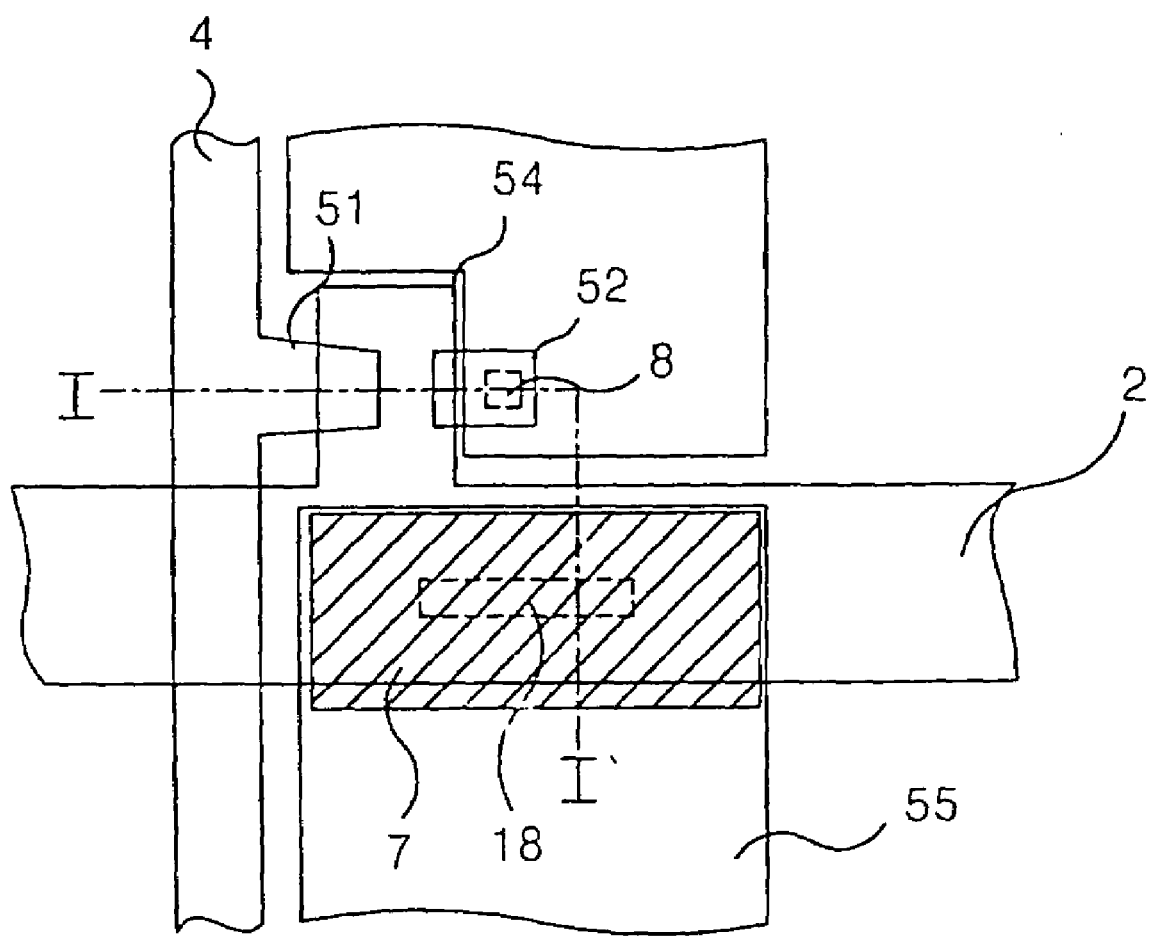
FIG. 1 is a plan view showing a structure of a conventional high-resolution liquid crystal display.
Figure 2:
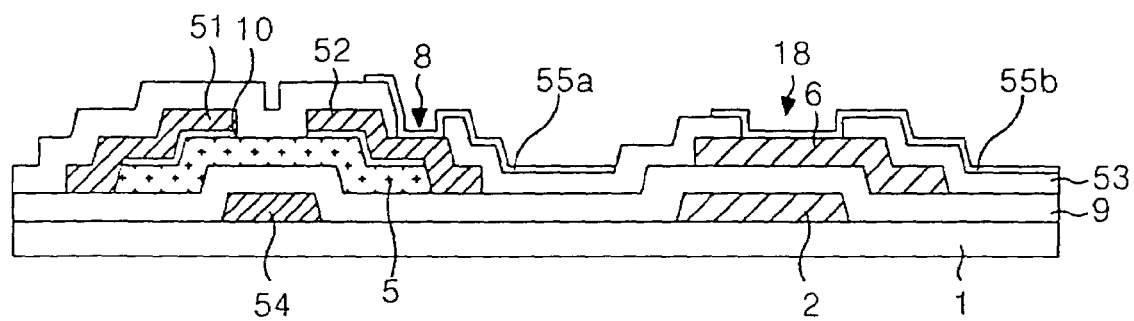
FIG. 2 is a sectional view of the liquid crystal display taken along the I–I' line in FIG. 1.
Figure 3A:
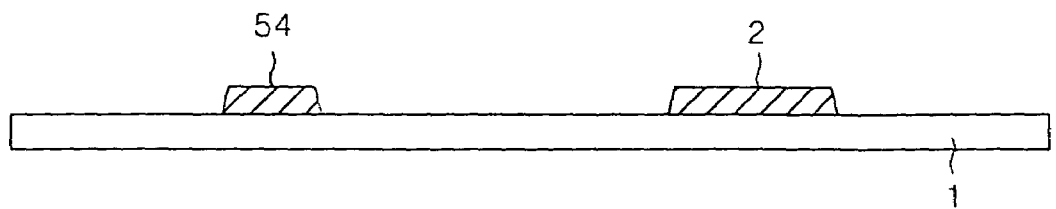
FIG. 3A to FIG. 3E are views for explaining a method of fabricating the liquid crystal display shown in FIG. 2.
Figure 3B:
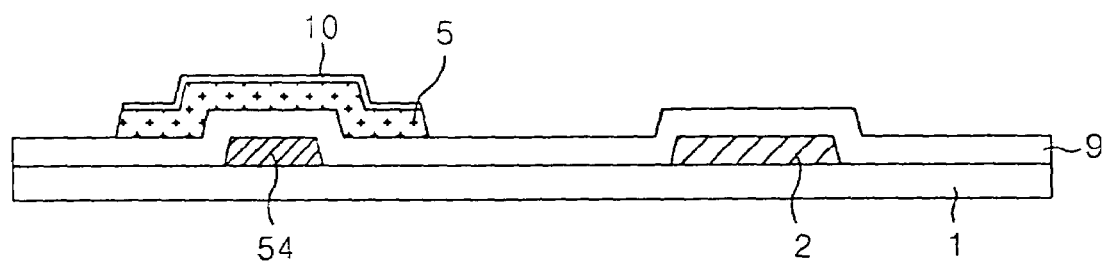
Figure 3C:
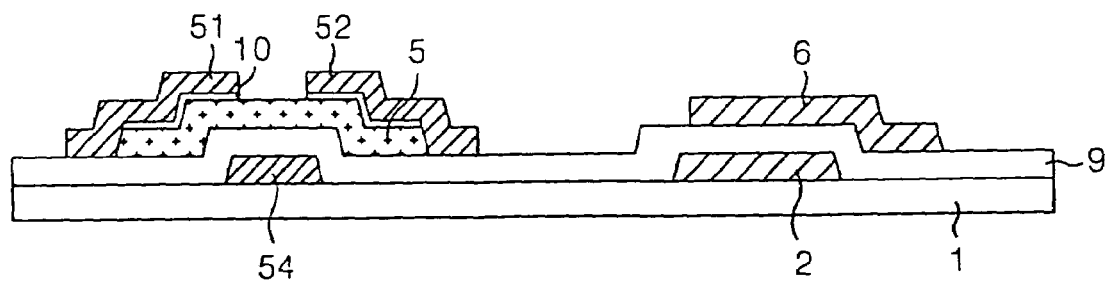
Figure 3D:
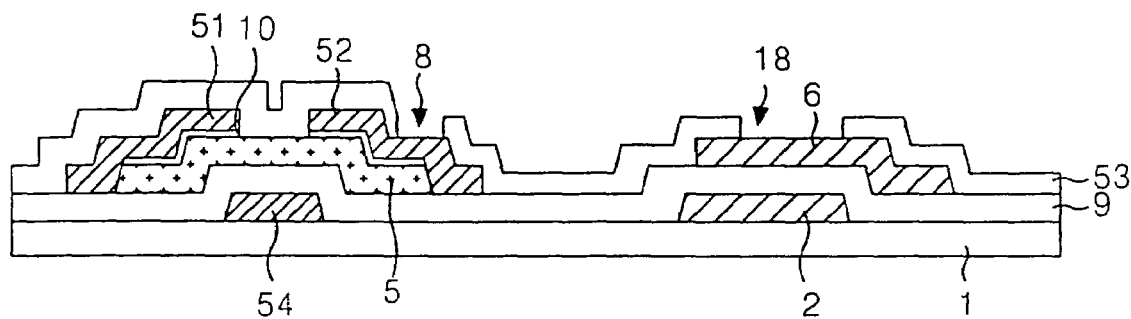
Figure 3E:
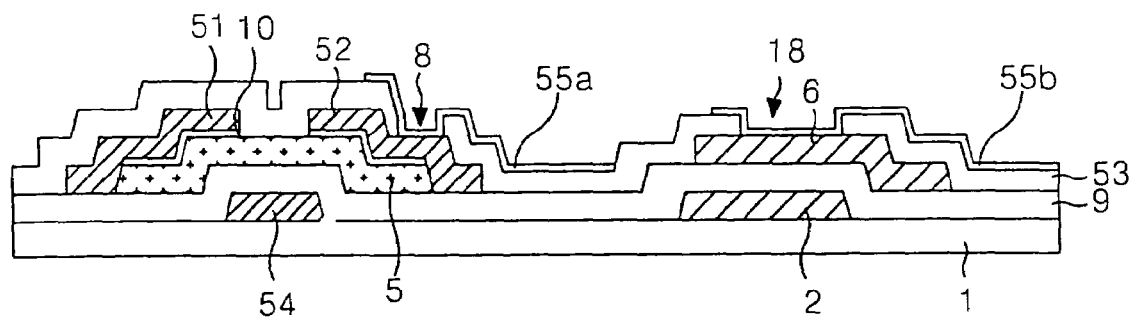
Figure 4:
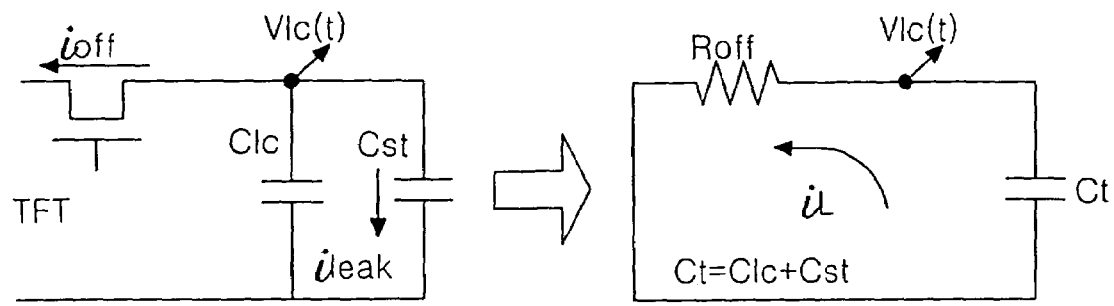
FIG. 4 is an equivalent circuit diagram for explaining a design of a storage capacitor of a liquid crystal cell in the liquid crystal display.
Figure 5:
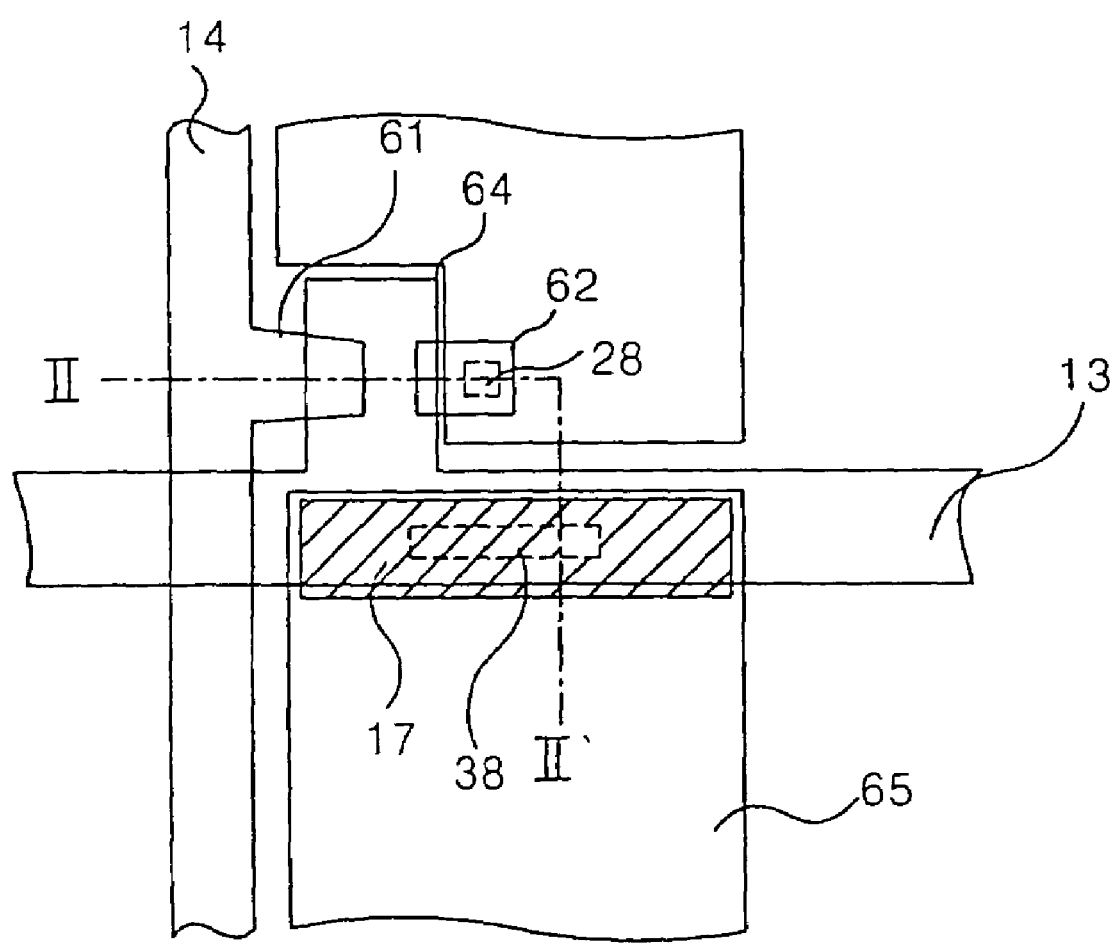
FIG. 5 is a plan view showing a structure of a high-resolution liquid crystal display according to an embodiment of the present invention.
Figure 6:
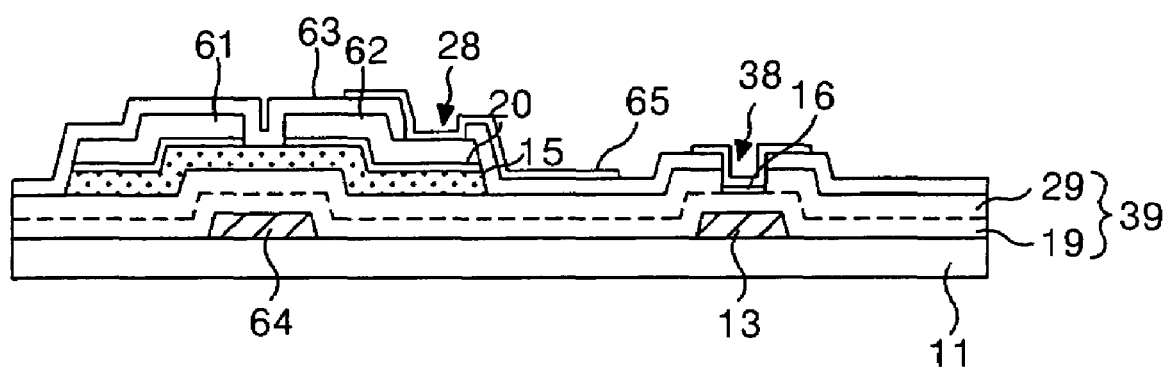
FIG. 6 is a sectional view of the liquid crystal display taken along the II–II' line in FIG. 5.

FIG. 5 and FIG. 6 are a plan view and a sectional view showing a structure of a high-resolution liquid crystal display (LCD) according to an embodiment of the present invention.

Referring to FIG. 5 and FIG. 6, the LCD includes a gate line 13 and a data line 14 formed on a substrate 11 to cross each other, a TFT arranged at an intersection between a data line 14 and a gate line 13, and a storage capacitor overlapping with the gate line 13.

The gate line 13 and the data line 14 are electrically isolated from each other by a gate insulating film 39. Each pixel is driven by the TFT electrically connected to the gate line 13 and the data line 14.

The TFT includes a gate electrode 64, source electrode 61 and drain electrode 62, an active layer 15, and an ohmic contact layer 20. The gate electrode 64 is connected to the gate line 13. The gate insulating film 39 is entirely deposited onto the substrate 11 to cover the gate electrode 64 and the gate line 13. The active layer 15 and the ohmic contact layer 20 are formed on the gate insulating film 39 to overlap with the gate electrode 64. The source electrode 61 is connected to the data line 14 while the drain electrode 62 is opposed to the source electrode 61, having a desired channel size therebetween.

A protective layer 63 is entirely deposited onto the gate insulating film 39 to cover the gate line 13, the data line 14 and the TFT. A pixel electrode 65a is connected to the drain electrode 62 via a first contact hole 8, and is provided on the protective layer 63.

The storage capacitor is charged by a voltage on the previous gate line 13 upon scanning of the previous scanning line to apply the charged voltage to the pixel electrode 65a upon scanning of the following scanning line. The storage capacitor includes the gate line 13 and a storage electrode 16 opposed to each other having the gate insulating film 39 therebetween. The storage electrode 16 is patterned simultaneously with the source electrode 61 and the drain electrode 62. The storage electrode 16 is connected to a transparent electrode pattern 65b via a second contact hole 38 defined on the protective layer 63. The transparent electrode pattern 65b is patterned simultaneously with the pixel electrode 65a.

FIG. 7A to FIG. 7F are sectional views for explaining a method of fabricating the LCD shown in FIG. 6.

Figure 7A:
FIG. 7A to FIG. 7F are views for explaining a method of fabricating the liquid crystal display shown in FIG. 6.

Referring first to FIG. 7A, the gate electrode 64 and the gate line 13 are provided on the substrate 11. The gate electrode 64 and the gate line 13 are formed by entirely depositing a metal such as aluminum (Al) or copper (Cu) using a deposition technique such as sputtering and then patterning it.

Figure 7B:
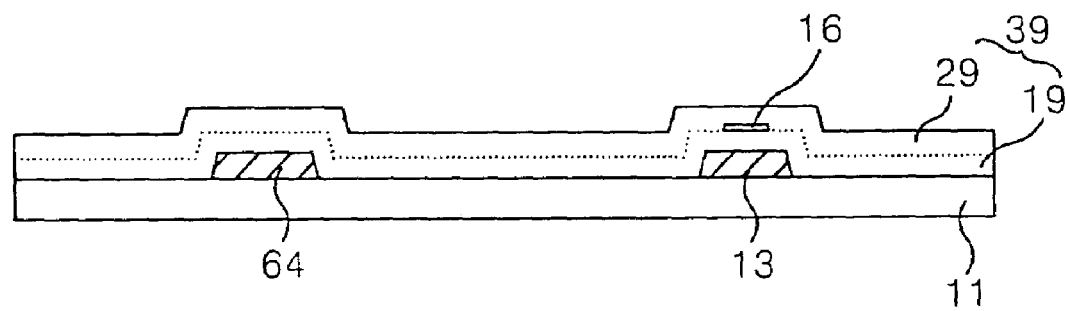

Referring to FIG. 7B, the storage electrode 16 and a second gate insulating film 29 are formed on a first gate insulating film 19.

The first gate insulating film 19 is formed by depositing an insulating material on the substrate 11 to a thickness of about 500 to 2500 Å using a process such as plasma enhanced chemical vapor deposition (PECVD) to cover the gate electrode 64 and the gate line 13. The storage electrode 16 is formed in correspondence with the gate line 13 by depositing a metal layer on the first gate insulating film 19 and then patterning it. The second gate insulating film 29 is formed by entirely depositing an insulating material on the first gate insulating film 19 to the same thickness to cover the storage electrode 16.

The gate insulating film 39 at the TFT area is the total of the thicknesses of the first gate insulating film 19 and the second gate insulating film 29. The total thickness of the gate insulating film 39 is similar to the thickness of the gate insulating film in the conventional art. Accordingly, the gate insulating film 39 between the gate line 13 and the storage electrode 16 is formed at a thickness about half that of the conventional art structure to increase capacitance.

The first insulating film 19 and second insulating film 29 are formed from an insulating material such as silicon nitride ($SiN_x$) or silicon oxide ($SiO_x$). The storage electrode 16 is formed by entirely depositing a metal layer such as chromium (Cr) or molybdenum (Mo) using a CVD technique or a sputtering technique and then patterning it.

Figure 7C:
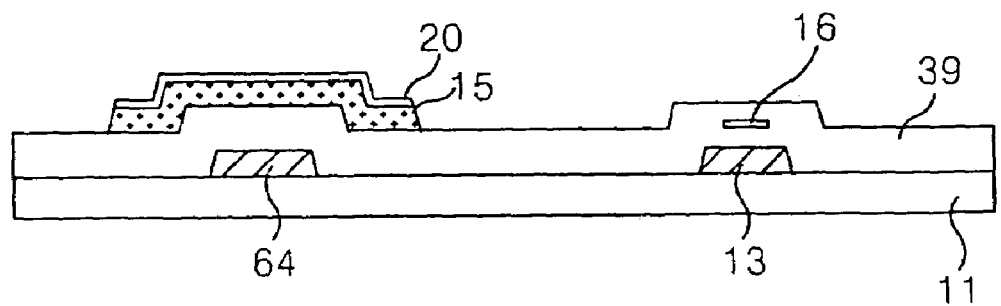

Referring to FIG. 7C, the active layer 15 and the ohmic contact layer 20 are provided on the gate insulating film 39. The active layer 15 and the ohmic contact layer 20 are formed by depositing first and second semiconductor material layers after forming the gate insulating film 39 on the substrate 11 to cover the gate electrode 64 and then patterning them.

The active layer 15 is formed from the first semiconductor material layer of amorphous silicon that is not doped with an impurity. In contrast, the ohmic contact layer 20 is formed from the second semiconductor material layer of amorphous silicon doped with an n-type or p-type impurity at a high concentration.

Figure 7D:
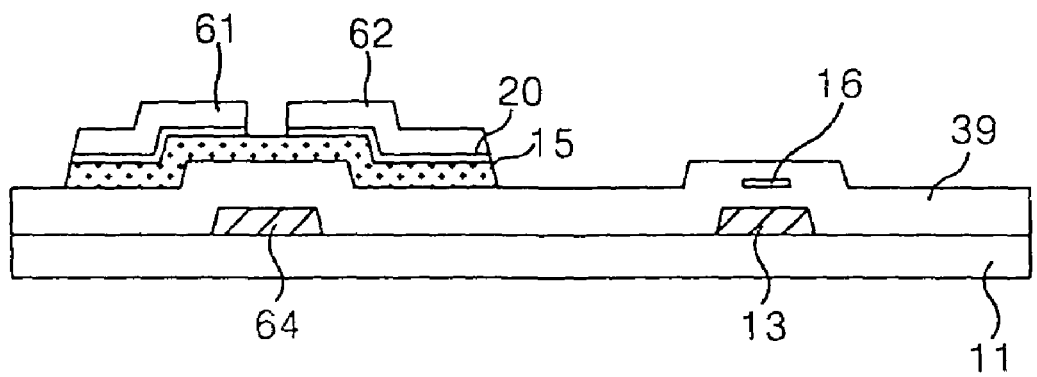

Referring to FIG. 7D, the data line 14 and the source electrode 61 and drain electrode 62 are provided on the gate insulating film 39.

The source electrode 61 and drain electrode 62 are formed by entirely depositing a metal layer such as chromium (Cr) or molybdenum (Mo) using a chemical vapor deposition (CVD) technique or a sputtering technique and then patterning it. After the source electrode 61 and drain electrode 62 are patterned, the ohmic contact layer 20 is formed at an area corresponding to the gate electrode 64 and also is patterned to expose the active layer 15. A portion of the active layer 15 exposed by the source electrode 61 and drain electrode 62 serves as a channel. The data line 14 and the source electrode 61 and drain electrode 62 are made from a material such as chromium (Cr) or molybdenum (Mo).

Figure 7E:
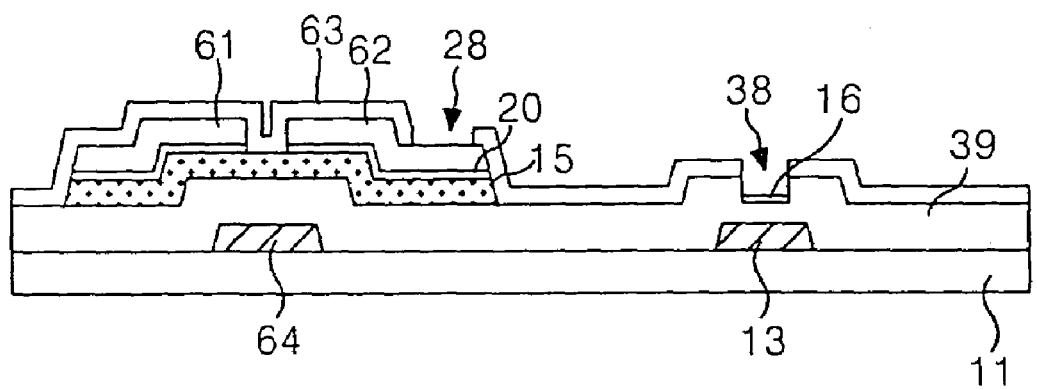

Referring to FIG. 7E, the protective layer 63 and the first contact hole 28 and second contact hole 38 are provided on the gate insulating layer 39.

The protective layer 63 and the first contact hole 28 and second contact hole 38 are formed by depositing an insulating material on the gate insulating layer 39 to cover the source electrode 61 and drain electrode 62 and then patterning it. The second contact hole 38 is formed to the same thickness as the first contact hole 28 by patterning the second gate insulating film 29 using the protective layer 63 as a mask to expose the storage electrode 16. The protective layer 63 is made from an inorganic insulating material such as silicon nitride ($SiN_x$) or silicon oxide ($SiO_x$), or an organic insulating material having a small dielectric constant such as an acrylic organic compound, Teflon, benzocyclobutene (BCB), Cytop or perfluorocyclobutane (PFCB).

Figure 7F:
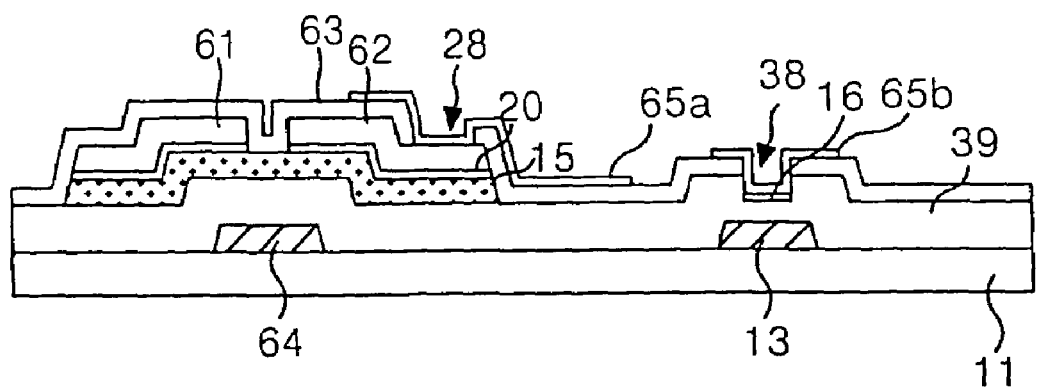

Referring to FIG. 7F, the pixel electrode 65a and the transparent electrode pattern 65b are provided on the protective layer 63. The pixel electrode and the transparent electrode pattern are formed by depositing a transparent conductive material such as indium-tin-oxide (ITO), indium-zinc-oxide (IZO) or indium-tin-zinc-oxide (ITZO) on the protective layer 63 and then patterning it. The pixel electrode 65a is electrically connected to the drain electrode 62 via the first contact hole 28, and the transparent electrode pattern 65b is electrically connected to the storage electrode 16 via the second contact hole 38.

In FIG. 7A to FIG. 7F, a distance between the gate line 13 and the storage electrode 16, that is, a thickness of the first gate insulating film 9 is less than the thickness of gate insulating film in the conventional art, reduced to increase a storage capacitor value. Interference between the storage electrode 16 and the pixel area is not required owing to such an increase in a storage capacitor value, so that it becomes possible to improve an aperture ratio. The improvement in aperture ratio according to the present invention can be seen from the following tables.

Table 3 indicates an aperture ratio of a liquid crystal display according to a thickness of the gate insulating film 39 in the case of a liquid crystal display having a resolution of 200 PPI; and Table 4 and Table 5 indicate aperture ratios of a liquid crystal display according to a thickness of the gate insulating film 39 formed between the gate line 13 and the storage electrode 39 in the case of the first and second models of the ferroelectric (FLC) display.

TABLE 3

| Thickness of gate insulating film between the gate line and the storage electrode (Å) | Storage size ($\mu m^2$) | Aperture area ($\mu m^2$) | Aperture ratio (%) |
|---|---|---|---|
| 4000 | 599 | 2414 | 45.6% |
| 3500 | 524 | 2489 | 47.0% |
| 3000 | 449 | 2564 | 48.4% |
| 2500 | 374 | 2639 | 49.9% |
| 2000 | 300 | 2714 | 51.3% |
| 1500 | 225 | 2788 | 52.7% |
| 1000 | 150 | 2863 | 54.1% |
| 500 | 75 | 2938 | 55.5% |

TABLE 4

| Thickness of gate insulating film between the gate line and the storage electrode (Å) | Storage size ($\mu m^2$) | Aperture area ($\mu m^2$) | Aperture ratio (%) |
|---|---|---|---|
| 4000 | 2784.5 | 15374 | 59.2% |
| 3500 | 2436 | 15722 | 60.6% |
| 3000 | 2088 | 16070 | 61.9% |
| 2500 | 1740 | 16418 | 63.3% |
| 2000 | 1392 | 16766 | 64.6% |
| 1500 | 1044 | 17114 | 66.0% |
| 1000 | 696 | 17462 | 67.3% |
| 500 | 348 | 17810 | 68.6% |

TABLE 5

| Thickness of gate insulating film between the gate line and the storage electrode (Å) | Storage size ($\mu m^2$) | Aperture area ($\mu m^2$) | Aperture ratio (%) |
|---|---|---|---|
| 4000 | 7113.7 | 11044 | 42.6% |
| 3500 | 6224 | 11934 | 46.0% |
| 3000 | 5335 | 12823 | 49.4% |
| 2500 | 4446 | 13712 | 52.8% |
| 2000 | 3557 | 14601 | 56.3% |
| 1500 | 2668 | 15490 | 59.7% |
| 1000 | 1778 | 16380 | 63.1% |
| 500 | 889 | 17269 | 66.6% |

It can be seen from Table 3 to Table 5 that if a thickness of the gate insulating film 39 formed between the gate line 13 and the storage electrode 16 is reduced to increase a storage capacitor value (Cst) and to decrease a storage area, then an aperture ratio is improved.

For instance, in the case of the second model of the FLC display, if a thickness of the insulating film is reduced from 4000 Å into 2000 Å, then an improvement in an aperture ratio of more than 10% can be obtained.

As described above, according to the present invention, the storage electrode is formed within the gate insulating film to reduce a thickness between the conductive materials, thereby increasing a capacitance value. Accordingly, the storage capacitor area is set to a small size to thereby improve an aperture ratio. In addition, such an increase in a storage capacitor value can remove a flicker and a residual image to improve picture quality, thereby realizing a high picture quality.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device including a data line supplied with a data signal, a gate line supplied with a scanning signal, a pixel electrode for driving a liquid crystal cell, and a thin film transistor for applying the data signal to the pixel electrode in response to the scanning signal, the device comprising:
   a gate insulating film entirely covering the gate line wherein the data line is disposed on the gate insulating film, and wherein the gate line is disposed directly on a substrate;
   a storage electrode sunken in the gate insulating film to overlap with the gate line, said storage electrode uncovered by and disposed upon said gate insulating film; and
   a protective layer on the gate insulating film to cover the data line, the gate line and the thin film transistor,
   wherein a contact hole passes through the protective layer and a portion of the gate insulating film having the storage electrode sunken therein, the pixel electrode is connected to the storage electrode via the contact hole, and the gate insulating film contacts a vertical side surface of the storage electrode.

2. The liquid crystal display device according to claim 1, wherein a distance between the gate line and the storage electrode is about 500 to 2500 Å.

3. A method of fabricating a liquid crystal display having a storage electrode, comprising:
   forming a gate line and a gate electrode of a thin film transistor on a substrate;
   depositing a first gate insulating film on the substrate to cover the gate electrode and the gate line;
   forming the storage electrode on the first gate insulating film to overlap with the gate line;
   depositing a second gate insulating film on the first gate insulating film to cover the storage electrode;
   forming an active layer and an ohmic contact layer on the gate insulating films;
   forming a source electrode and a drain electrode of the thin film transistor opposed to each other having a desired channel therebetween on the ohmic contact layer;
   forming a protective layer on the gate insulating film to cover the source electrode and the drain electrode;
   defining a first contact hole exposing the drain electrode on the protective layer;
   defining a second contact hole exposing the storage electrode on the protective layer and the second gate insulating film; and
   forming a pixel electrode connected to the drain electrode, via the first contact hole, and connected to the storage electrode on the protective layer, via the second contact hole.

4. The method according to claim 3, wherein a distance between the gate line and the storage electrode is about 500 to 2500 Å.

5. A liquid crystal display device comprising:
   a gate line and a data line on a substrate to cross each other, wherein the gate line is disposed directly on the substrate;
   a thin film transistor including a gate electrode, a source electrode, and a drain electrode, and provided at an intersection between the data line and the gate line;
   a storage electrode on a first gate insulating film to cover the gate electrode and the gate line;
   a second gate insulating film formed on the first gate insulating film, wherein the data line is disposed on the second gate insulating film so that the gate line is electrically isolated from the data line; and
   a protective layer formed on the second gate insulating film to cover the gate line, the data line and the thin film transistor,
   wherein a first contact hole passes through the protective layer and a portion of the second gate insulating film having the storage electrode formed on the first gate insulating film, wherein the storage electrode is connected to a transparent electrode pattern via the first contact hole and wherein a storage capacitor includes the storage electrode and the gate line opposed to each other and having the first gate insulating film formed therebetween.

6. The liquid crystal display device according to claim 3, further comprising an active layer and an ohmic contact layer formed on the second gate insulating film to overlap with the gate electrode.

7. The liquid crystal display device according to claim 5, wherein the gate electrode is connected to the gate line.

8. The liquid crystal display device according to claim 5, wherein the source electrode is connected to the data line.

9. The liquid crystal display device according to claim 8, wherein the drain electrode is opposed to the source electrode, and wherein a channel is formed between the source electrode and the drain electrode.

10. The liquid crystal display device according to claim 5, wherein a pixel electrode is connected to the drain electrode via a second contact hole provided on the protective layer.

11. A method of fabricating a liquid crystal display, comprising the steps of:
    forming a gate line and a gate electrode of a thin film transistor on a substrate;
    depositing a first gate insulating film on the substrate to cover the gate electrode and the gate line;
    forming a storage electrode on the first gate insulating film to overlap with the gate line;
    depositing a second gate insulating film on the first gate insulating film to cover the storage electrode;
    forming an active layer and an ohmic contact layer on the gate insulating films;
    forming a source electrode and a drain electrode of the thin film transistor opposed to each other having a desired channel therebetween on the ohmic contact layer;
    forming a protective layer on the gate insulating film to cover the source electrode and the drain electrode;
    forming a pixel electrode connected to the drain electrode; and
    forming a transparent electrode pattern connected the storage electrode on the protective layer.

12. The method according to claim 11, further comprising:
    defining a first contact hole for exposing the drain electrode on the protective layer; and defining a second contact hole for exposing the storage electrode on the protective layer and the second gate insulating film.

13. The method according to claim 12, wherein the second contact hole is formed to the same thickness as the first contact hole by patterning the second gate insulating film using the protective layer as a mask to expose the storage electrode.

14. The method according to claim 11, wherein the gate electrode and the gate line are formed by depositing a metal from one of aluminum and copper using sputtering and then patterning the metal.

15. The method according to claim 11, wherein the first gate insulating film is formed by depositing an insulating material to a thickness of about 500 to 2500 Å using plasma enhanced chemical vapor deposition.

16. The method according to claim 15, wherein the second gate insulating film is formed to the same thickness of the first gate insulating film.

17. The method according to claim 11, wherein the first and second gate insulating films are formed from one of silicon nitride and silicon oxide.

18. The method according to claim 11, wherein the storage electrode is formed by depositing a metal from one of chromium and molybdenum using a technique from one of chemical vapor deposition and sputtering, and then patterning the metal.

19. The method according to claim 11, wherein the active layer and the ohmic contact layer are formed by depositing first and second semiconductor materials, respectively, after forming the gate insulating films, and then patterning the materials.

20. The method according to claim 19, wherein the first semiconductor material includes undoped amorphous silicon.

21. The method according to claim 19, wherein the second semiconductor material includes one of n-type and p-type amorphous silicon at a high concentration.

22. The method according to claim 11, wherein the source and drain electrodes are formed by depositing a metal layer from one of chromium and molybdenum using a technique from one of chemical vapor deposition or sputtering, and then patterning the metal.

23. The method according to claim 11, wherein the protective layer includes one of silicon nitride and silicon oxide.

24. The method according to claim 11, wherein the protective layer includes an organic insulating material having a small dielectric constant selected from one of acrylic organic compound, Teflon, benzocyclobutene, Cytop, and perfluorocyclobutane.

25. the method according to claim 11, wherein the pixel electrode and the transparent electrode pattern are formed by depositing a transparent conductive material from one of indium-tin-oxide, indium-zinc-oxide, and indium-tin-zinc-oxide on the protective layer and then patterning the transparent conductive material.

* * * * *